United States Patent
Garg et al.

(10) Patent No.: US 10,990,733 B1
(45) Date of Patent: Apr. 27, 2021

(54) SHARED TIMING GRAPH PROPAGATION FOR MULTI-MODE MULTI-CORNER STATIC TIMING ANALYSIS

(71) Applicant: Cadence Design Systems, Inc., San Jose, CA (US)

(72) Inventors: Vibhor Garg, Union City, CA (US); Amit Dhuria, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/814,928

(22) Filed: Mar. 10, 2020

(51) Int. Cl.
*G06F 30/3315* (2020.01)
*G06F 119/12* (2020.01)

(52) U.S. Cl.
CPC ...... *G06F 30/3315* (2020.01); *G06F 2119/12* (2020.01)

(58) Field of Classification Search
CPC ............. G06F 30/3315; G06F 2119/12; G06F 30/3312
See application file for complete search history.

(56) References Cited

U.S. PATENT DOCUMENTS

| | | | |
|---|---|---|---|
| 8,745,561 B1 | 6/2014 | Garg et al. | |
| 8,788,995 B1 | 7/2014 | Kumar et al. | |
| 8,863,052 B1 | 10/2014 | Dhuria et al. | |
| 9,384,310 B1 * | 7/2016 | Keller | G06F 30/3312 |
| 9,405,882 B1 | 8/2016 | Dhuria et al. | |
| 9,501,607 B1 * | 11/2016 | Arsovski | G06F 30/398 |
| 9,529,962 B1 | 12/2016 | Dhuria et al. | |
| 9,852,246 B2 * | 12/2017 | Hathaway | G06F 30/3312 |
| 9,940,431 B2 * | 4/2018 | Gupta | G06F 30/3312 |
| 10,037,394 B1 * | 7/2018 | Kulshreshtha | G06F 30/3312 |
| 10,133,842 B1 * | 11/2018 | Kulshreshtha | G06F 30/3312 |
| 10,169,501 B1 | 1/2019 | Kulshreshtha et al. | |
| 10,255,403 B1 * | 4/2019 | Saurabh | G06F 30/398 |
| 10,296,700 B1 * | 5/2019 | Bai | G06F 30/394 |
| 10,643,019 B1 * | 5/2020 | Han | G06F 30/3308 |
| 10,733,346 B1 * | 8/2020 | Singh | G06F 30/327 |
| 10,831,959 B2 * | 11/2020 | Varma | G06F 30/394 |
| 2005/0172250 A1 * | 8/2005 | Kucukcakar | G06F 30/3312 716/113 |
| 2011/0185335 A1 * | 7/2011 | Oh | G06F 30/327 716/136 |
| 2011/0191740 A1 * | 8/2011 | Walker | G06F 30/398 716/132 |
| 2011/0252393 A1 * | 10/2011 | Sripada | G06F 30/3312 716/134 |
| 2012/0068754 A1 * | 3/2012 | Su | H03K 5/159 327/285 |

(Continued)

*Primary Examiner* — Nha T Nguyen
(74) *Attorney, Agent, or Firm* — Foley & Lardner LLP

(57) ABSTRACT

According to certain aspects, the present embodiments include techniques for performing a single timing analysis run for a plurality of views representing different modes and/or corners. An embodiment analyzes and maintains relevant timing information that is different for different views, but otherwise maintains the same information for all views. This allows each individual view in a single run to be analyzed in the same manner as separate runs for each separate view, thereby ensuring the same QoR. These and other embodiments provide substantial savings in runtime and memory consumption over other approaches.

20 Claims, 13 Drawing Sheets

(56) References Cited

U.S. PATENT DOCUMENTS

| | | | |
|---|---|---|---|
| 2012/0324410 A1* | 12/2012 | Sripada | G06F 30/3312 |
| | | | 716/113 |
| 2013/0159952 A1* | 6/2013 | Niu | G06F 30/39 |
| | | | 716/113 |
| 2015/0310151 A1* | 10/2015 | Hathaway | G06F 30/3312 |
| | | | 716/108 |
| 2016/0110485 A1* | 4/2016 | Sequeira | G06F 30/30 |
| | | | 716/108 |
| 2016/0188760 A1* | 6/2016 | Drasny | G06F 30/327 |
| | | | 716/104 |
| 2016/0267214 A1* | 9/2016 | Lim | G06F 30/398 |

* cited by examiner

US 10,990,733 B1

SHARED TIMING GRAPH PROPAGATION FOR MULTI-MODE MULTI-CORNER STATIC TIMING ANALYSIS

TECHNICAL FIELD

The present embodiments relate generally to integrated circuits, and more particularly to performing timing analyses of designs of integrated circuits across a plurality of constraint modes and delay corners.

BACKGROUND

Electronic design automation (EDA) tools are used to design integrated circuits. Integrated circuits can include many thousands and perhaps millions of circuit elements (e.g., transistors, logic gates, diodes) and interconnecting wires and busses. Prior to fabrication of the integrated circuit design, the design can be analyzed to ensure that it meets design constraints. The design constraints can include, for example, signal propagation delays through one or more portions of the designed integrated circuit and power consumption of the designed integrated circuit. The EDA tools can provide several tools for analyzing the timing delays in the designed integrated circuit. For example, static timing analysis (STA) tools analyze the designed integrated circuit to determine timing characteristics throughout the designed integrated circuit. Designers can, based on the STA analysis, make changes to the design such that that the designed integrated circuit meets the specified design constraints.

SUMMARY

According to certain aspects, the present embodiments include techniques for performing a single timing analysis run for a plurality of views representing different modes and/or corners. An embodiment analyzes and maintains relevant timing information that is different for different views, but otherwise maintains the same information for all views. This allows each individual view in a single run to be analyzed in the same manner as separate runs for each separate view, thereby ensuring the same QoR. These and other embodiments provide substantial savings in runtime and memory consumption over other approaches.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
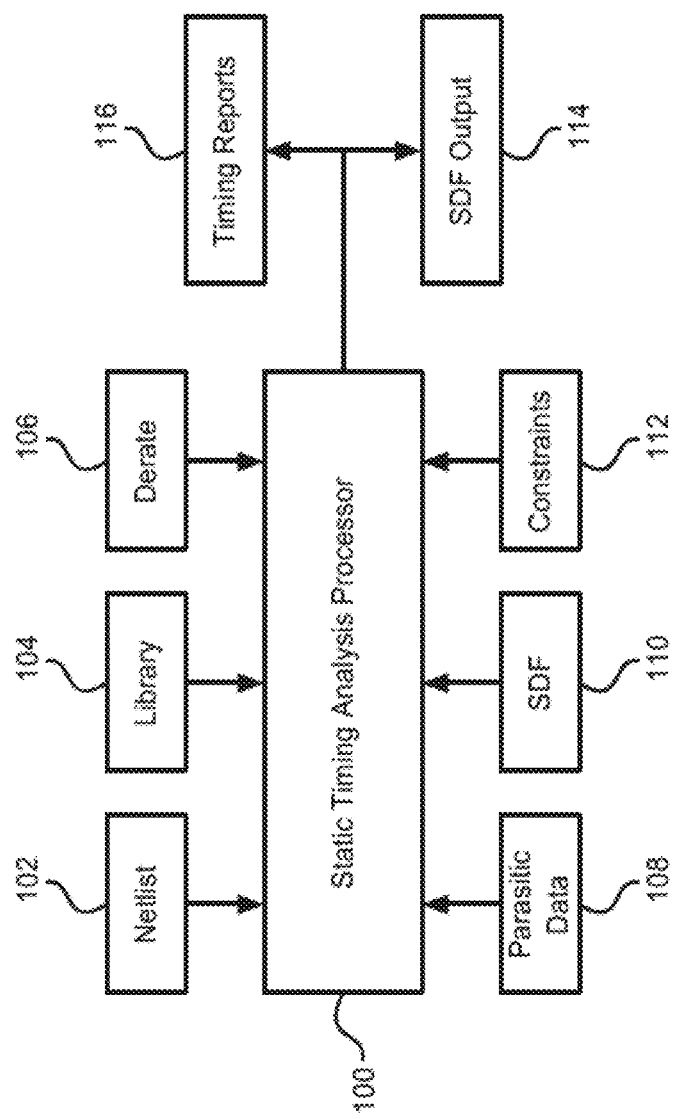
FIG. 1 depicts an example block diagram of static timing analysis (STA) of a circuit design, according to present embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments include techniques for performing a single timing analysis run for a plurality of views representing different constraint modes and/or delay corners for a given integrated circuit design.

As set forth above, integrated circuits can be designed to include thousands to millions of components. Before a designed integrated circuit is signed-off for fabrication, the design is analyzed to verify that various circuit parameters such as timing and power meet the specified requirements. For example, the design can be analyzed to determine timing delays associated with various portions of the circuit, and to verify whether the delays meet required delay constraints. One example tool used for timing analysis is a static timing analysis (STA) tool. The STA tool can determine the timing delays without actually simulating the design. In particular, the STA tool can perform delay calculations of various portions of the design based on timing models without having to verify the functionality of the design. The delay calculations can provide an estimate of the delays along various paths within the design. A designer can compare the delays through various paths within the design to their respective required delays. Paths that have delays that are greater than their respective required delays can be identified as violating paths. The designer can modify or optimize various circuit components within the violating paths with the aim to reduce the delay associated with the violating paths. After optimization, the designer can re-run the STA to verify whether the optimizations improved the delays of the violating paths. This design process of STA analysis, design optimization, and verification of timings can be repeated until the designed integrated circuit meets the timing constraints, and the design can be signed-off.

FIG. 1 depicts an example block diagram of a system 150 according to embodiments.

As shown, system 150 can include a STA processor 100 that is configured to carry out static timing analysis (STA) on a circuit design. The STA processor 100 can receive as inputs a netlist definition 102, delay library 104, derate information 106, parasitic data 108, standard delay format data 110, and constraints 112. The netlist definition 102 can include a model that defines a circuit that is to be analyzed. In particular, the netlist definition 102 can provide a description of the connectivity of various electronic components within the circuit. As an example, the netlist definition 102 can include a gate level description of the circuit design, which describes the connectivity of various logic gates within the circuit. The delay library 104 can include delay information associated with various standard gates (e.g., AND gate, OR gate, NAND gate, etc.), macros, and non-standard gates described in the netlist. In some instances, the delay information can include minimum and maximum delay associated with the gates. Derate information 106 specify derate factors associated with one or more components of the circuit. Derate factors can model the effects of varying operation conditions by adjusting delay values calculated for individual timing arcs associated with one or more components of the circuit. Parasitic data 108 can include capacitive, inductive, and electromagnetic coupling data associated with interconnects in the circuit. The parasitic data can be used to adjust delay values between circuit stages. Standard delay format data (SDF) 110 can include pre-defined delays for certain gates or interconnects in a standard format. Constraints 112 can include values of parameters against which the design can be evaluated. For example, the constraints can include required times for delays across gates, circuit paths, circuit modules, and input/output pairs, and other portions of the circuit.

In embodiments, the system 150 can be implemented by one or more general purpose computers that are loaded with software (e.g., EDA tools) and/or customized to include hardware for interactively implementing physical electronic designs. In some embodiments, the system can comprise one or more computing systems having various components not shown such as processor(s) or processor core(s), memory, disks, etc. The EDA software and/or custom hardware may further include interactive or automated modules such as a placer, a routing engine, a layout editor, a design rule checker, a verification engine, or a floorplanner, etc. as will be appreciated by those skilled in the art. In some embodiments, the one or more computing systems are implemented in a "cloud" configuration and/or a client/server configuration. For example, one or more server computers may be loaded with application software (e.g., a STA tool) for implementing some or all of the methodology of the present embodiments, and one or more client computers can communicate with the server computer(s) via a network to perform some or all of the methodology of the embodiments for a particular design. In operation, a user can interact with the STA tool via a user interface module to perform analyses on designs in accordance with methodologies to be described in more detail herein.

In operation, the STA processor 100 can take into consideration the above mentioned inputs and generate timing information for the circuit represented by the netlist 102. The STA processor 100 need not simulate the circuit described by the netlist 102 to determine the timing information. That is, the timing information can be independent of the data values being applied at input pins of the circuit. In some examples, the STA processor 100 can generate an SDF output 114, which include the delays determined for each gate within the netlist. The STA processor 100 also can generate timing reports 116, which can include timing characteristics of the circuit. For example, the timing reports 116 can identify the circuit paths and circuit stages that may violate the constraints 112 (such as required time). That is, the timing report 116 can identify circuit paths and circuit stages that have arrival times that are greater than their respective required times specified in the constraints 112. In some instances, where the circuit includes sequential logic in addition to combinatorial logic, the timing reports 116 may include a list of circuit paths that violate setup and hold times between any two sequential logic circuits. The setup and hold times may be specified by the constraints 112. The STA processor 100 can generate the SDF output 114 and the timing reports based on the STA approach discussed below in relation to FIGS. 2-8. The SDF output 114 and the timing reports can be used to update the timing of the netlist 102. It should be noted that the netlist 102 can include or be implemented by one or more computer-readable files (e.g., GDS II, OASIS, etc.) that describe the circuit layout containing physical locations and dimensions of the circuit's components, interconnections, and various layers from the design, in accordance with a target fabrication process. The one or more files can be provided by a fab so the design can be fabricated to create the integrated circuit. As is well known in the art, the designed integrated circuit can eventually be fabricated by lithography transferring or printing the circuit layout to a semiconductor substrate in a series of layers that collectively will form the features that constitute the devices that make up the components of the integrated circuit.

The STA processor 100 can view the netlist of the circuit as a directed acyclic timing graph, where pins/ports of circuit elements (such as logic gates or other circuit components) and/or the circuit elements can be considered as nodes of the timing graph, and interconnects between the nodes can be considered as edges of the timing graph. For example, a two input NAND gate circuit (which includes two input pins and one output pin) can include two nodes corresponding to the two input pins, one node corresponding to the NAND gate logic, and another node corresponding to the output pin. The interconnects connecting these nodes can be considered as edges. In another approach, (known as the pin node convention) each pin/port of the logic gate is considered as a node.

Regardless of the convention used to correspond circuit elements and interconnects to nodes and edges of the timing graph, the STA processor 100, based on the inputs, can assign delays to the nodes and the edges of the timing graph. For example, the STA processor 100 can assign delays to each of the two edges corresponding to the two input NAND gate, and assign a set of delays to the NAND gate logic. The set of delays assigned to the NAND gate logic represent the different delays of the gate logic based on the transitioning input, the direction of transition (rise or fall), and the resulting transition of the output. Where the netlist includes both combinatorial and sequential logic, the STA processor 100 can represent the netlist as a set of combinatorial blocks that lie between the sequential elements, and generate timing graphs for each of the combinatorial blocks.

The STA processor 100 can determine timing paths within the timing graph. As an example, a path on the timing graph between two points can represent a timing path. In some examples, a timing path can begin at a startpoint, such as an input port or a register output, and end at another endpoint such as an output port or a register input. The register input and output can refer to, for example, input and output, respectively, of one or more flip-flops, while the input/output ports can refer to input/output ports of combinatorial logic blocks. Each node and edge in the timing path can have an associated delay. For example, a node representing a gate logic can have an associated gate delay (or propagation delay), and edges representing interconnects can have associated wire delays or transition delays. A timing path may also represent a signal delay between the endpoints. For example, a timing path between a start and an endpoint can include signal delays of all nodes and edges between the two endpoints. The delays associated with the nodes and edges can correspond to gate delays and wire delays or transition delays of gates and interconnects between the two endpoints. The timing path may also be represented by a series of timing arcs, where each timing arc describes the timing relationship between an input pin and an output pin of a gate (e.g., a cell timing arc) or between an output pin and an input pin of an interconnect (e.g., a wire timing arc). Each timing arc can describe a delay across the timing arc as well as an unateness (positive, negative, or non-unate) of the timing arc. The STA processor 100 can utilize the timing arc information to determine delays associated with a timing path.

A netlist, based on the size of the circuit it represents, can include a large number of timing paths. For example, large integrated circuits can have millions of timing paths. The STA processor 100 can also determine the timing paths based at least on the netlist 102 and the timing information provided by the library 104. The number of timing paths in the circuit can be very large based on the number of nodes. The number of timing paths can further increase based on the number of multi-input and multi-output nodes (or circuit stages) present in the circuit. For example, for a single circuit stage with multiple inputs and multiple outputs, one timing path corresponds to each input-output combination of the circuit stage. These combined with paths through other multi-input multi-output circuit stages can exponentially increase the number of timing paths present in a circuit.

In addition to the number of timing paths, STA analysis flow for a full-chip implementation requires analysis of the same netlist across various combinations of constraint modes, delay corners and library sets (e.g. "views"). The combinations of these can quickly yield hundreds of timing analysis views that need to be analyzed. Today, users run analyses on these separate timing analysis views as individual separate runs in a process called Single Mode Single Corner (SMSC) timing analysis. This can be very time and resource consuming.

The present embodiments are directed to techniques that allow designers or users to combine the analysis of multiple views into a single run (e.g. Multiple Mode Multiple Corner or MMMC) with a tremendous savings in runtime and memory. Further, the present embodiments achieve quality of results (QoR) of each timing analysis view in the combined run in MMMC to match the QoR of each individual, separate run in SMSC.

Current conventional approaches of combining multiple views into a single MMMC setup perform a simplistic analysis whereby the analysis ends up being a union of analyses of all individual views. Conventional approaches to MMMC also cause analysis of one view to impact performance and timing results on other, completely independent views. This causes both performance as well as QoR degradation as compared to individual SMSC runs.

FIGS. 2A to 2D illustrate one problem with conventional approaches.

Figure 2A:
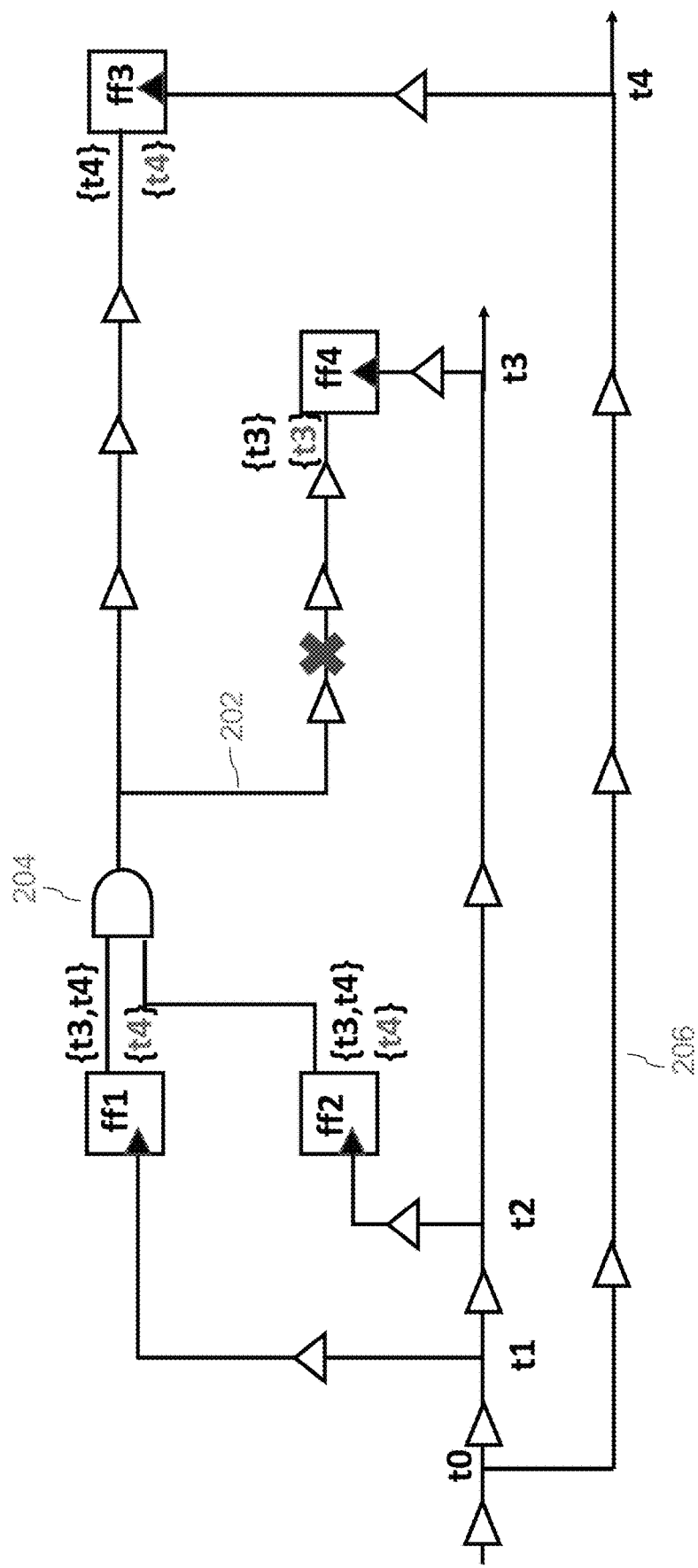
FIGS. 2A-2D are circuit diagrams illustrating example issues with conventional approaches.

The example circuit to be analyzed shown in FIG. 2A includes launch registers ff1, ff2 having launch tags t1 and t2, respectively. The circuit further includes capture registers ff3 and ff4 having capturing tags t4 and t3, respectively. The tags further originate from a root t0. In this example, there are two views for SMSC analysis, View 1 and View 2. More particularly, as further illustrated by the X in this example, the path 202 ending in capture register ff4 is a disabled arc (e.g. a constraint) for View 2 but not View 1.

As part of SMSC analysis, the tag sets at the capture registers ff3, ff4 are back-propagated to the launch registers ff1, ff2. In View 1, as indicated by the upper tag sets in FIG. 2A, because there is no disabled arc, tag sets {t3} and {t4} from capture registers ff4 and ff3, respectively, merge at the AND gate 204 to form tag set {t3,t4} and reach both launch registers ff1 and ff2. In View 2, as indicated by the lower tag sets in FIG. 2A, the back propagation of tag set {t3} from capture register ff4 stops at X. So only tag set {t4} from capture register ff3 reaches launch registers ff1, ff2.

When running SMSC for View 1, the least possible common ancestor of launch tag t1 and capture set {t3, t4} is t1. Meanwhile, the least possible common ancestor of launch tag t2 and capture set {t3, t4} is t2. So the phases on the data network do not merge at the AND gate 204 in View 1 of the SMSC analysis. By contrast, when running SMSC for View 2, the least possible common ancestor of launch tag t1 and capture set {t4} is t0 due to the path 206. Meanwhile, the least possible common ancestor of launch tag t2 and capture set {t4} is also t0 due to the path 206. So phases on the data network merge at the AND gate 204 in View 2 of the SMSC analysis.

Figure 2B:
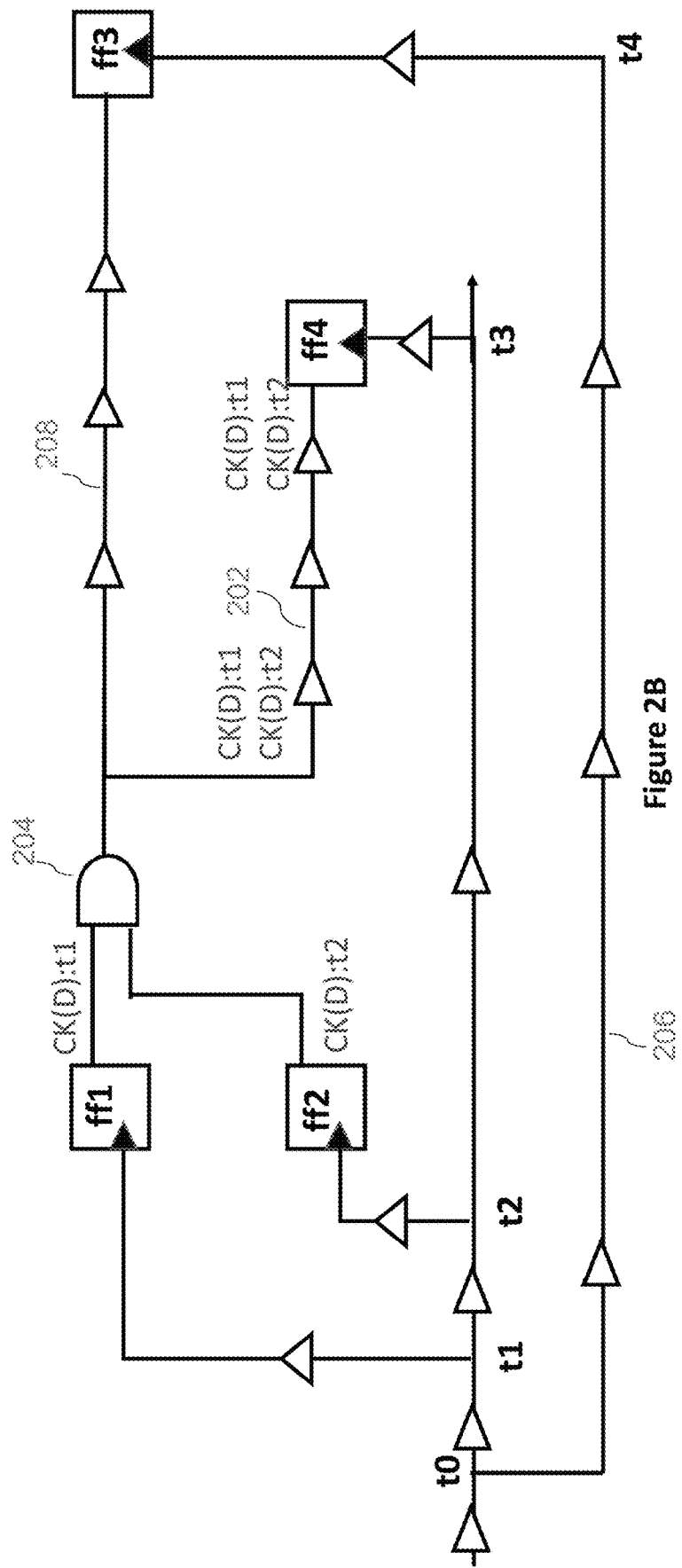
Figure 2C:
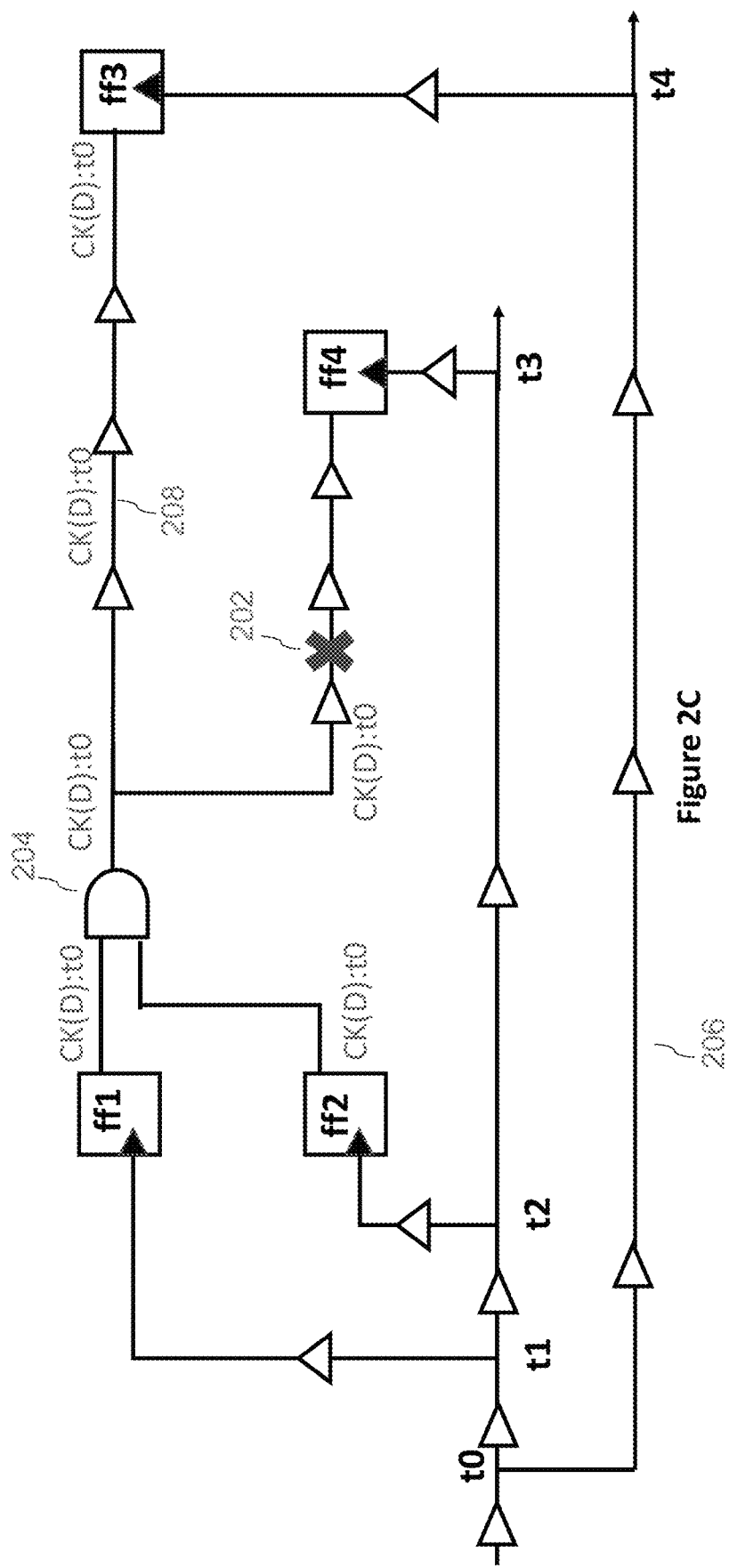

These and other aspects of the SMSC analyses of Views 1 and 2 are illustrated in further detail in FIGS. 2B and 2C.

More particularly, FIG. 2B illustrates the phases seen in the data network for View 1 of the SMSC analysis. As set forth above, the arc 202 is not disabled in this view. As shown in FIG. 2B, the phases from ff1 and ff2 have launch phases CK(D):t1 and CK(D):t2, respectively, due to their least possible common ancestors being t1 and t2, respectively. So these different phases from the launch registers on the data network do not merge after the AND gate 204 (indicated by the two separate phases CK(D):t1 and CK(D):t2 after the AND gate 204 being preserved). These two separate phases propagate along path 202 to capture register ff4. As for the path 208 ending at capture register ff3, it sees only a single phase CK(D):t0 due to the least possible common ancestor for launch registers ff1 and ff2 being t0 (by virtue of path 206).

Meanwhile, FIG. 2C illustrates the phases seen in the data network for View 2 of the SMSC analysis.

As used herein, a phase refers to a programmably established data object employed to propagate through the timing graph of the circuit design. Each phase maintains timing information and measures accounting for different domains of each clock throughout the circuit design. A phase propagates from the leftmost or upstream clock root and processes branch tags that it encounters along a path that it takes by reading, storing, and writing tags (also referred to as lineage tags in certainly exemplary embodiments herein). For example, if a phase encounters a branch tag, then the phase records the branch tag and propagates the information therein further through the timing graph. Additionally, the phase may mark each branch that it encounters with such tag including a historical path of ancestors it encountered in traversing the timing graph from input to arrive at the branching node.

A phase is preferably established as a class object with data fields and member methods acting upon the data fields thereof in accordance with object oriented programming (OOP) principles. A tag may be stored as a struct data field of the phase object though any suitable data structure may be employed. Preferably, each tag maintains a plurality of pointers pointing memory locations of at least one branch tag associated with a node of the timing graph. Each tag in the exemplary embodiments herein points to at least one parent node and/or to each ancestor node thereof. Additionally, data fields may contain further classes, structs, pointers to memory addresses or objects, or certain predefined variable types, such as integer, floating point, strings, arrays, vectors, marker tags including branch and cppr tags, and the like. The task of propagating phases across timing arcs is preferably executed by an auxiliary class and other classes within the system (e.g. system 150) predefined to traverse the timing graph or netlist data of a circuit design.

Further details regarding phases and tags, and how phases are propagated in the data network, as can be adapted for use in the present embodiments, can be found in U.S. Pat. No. 8,745,561, the contents of which are incorporated herein by reference in their entirety.

As set forth above, the arc 202 is disabled in View 2. As a result, there is no capture register ff4 that needs to be accounted for in this View 2. Therefore, as shown in FIG. 2C, the least possible common ancestor of both launch tag t1 and launch tag t2 is t0 due to the paths 206 and 208 leading to the same capture register ff3. Stated differently, path 206 is a clock path and path 208 is a data path. So there are clock path segments from t0→t1, from t0→t2 and from t0→t4, and the common ancestor for both t1, t4 and t2, t4 is t0. Because the common ancestors for both launch/capture pairs are the same, there is only a single phase CK(D):t0 from launch registers ff1 and ff2. So phases on the data network merge at the AND gate 204 and propagate on to capture register ff3 in View 2 of the SMSC analysis.

Because conventional SMSC is able to separately account for the different phases and tag sets that are included in Views 1 and 2, the timing analysis is accurate, but at the expense of computation time and resources.

MMMC aims to reduce such expense by handling all views together. For running MMMC, processing for the Views 1 and 2 are handled differently than in SMSC. For example, since the arc 202 is active in at least one view, tag set {t3} propagates across X. Therefore, both launch registers ff1, ff2 get merged tag set {t3, t4} when running MMMC for both views. This causes phases to not merge at the AND gate in both views.

Figure 2D:
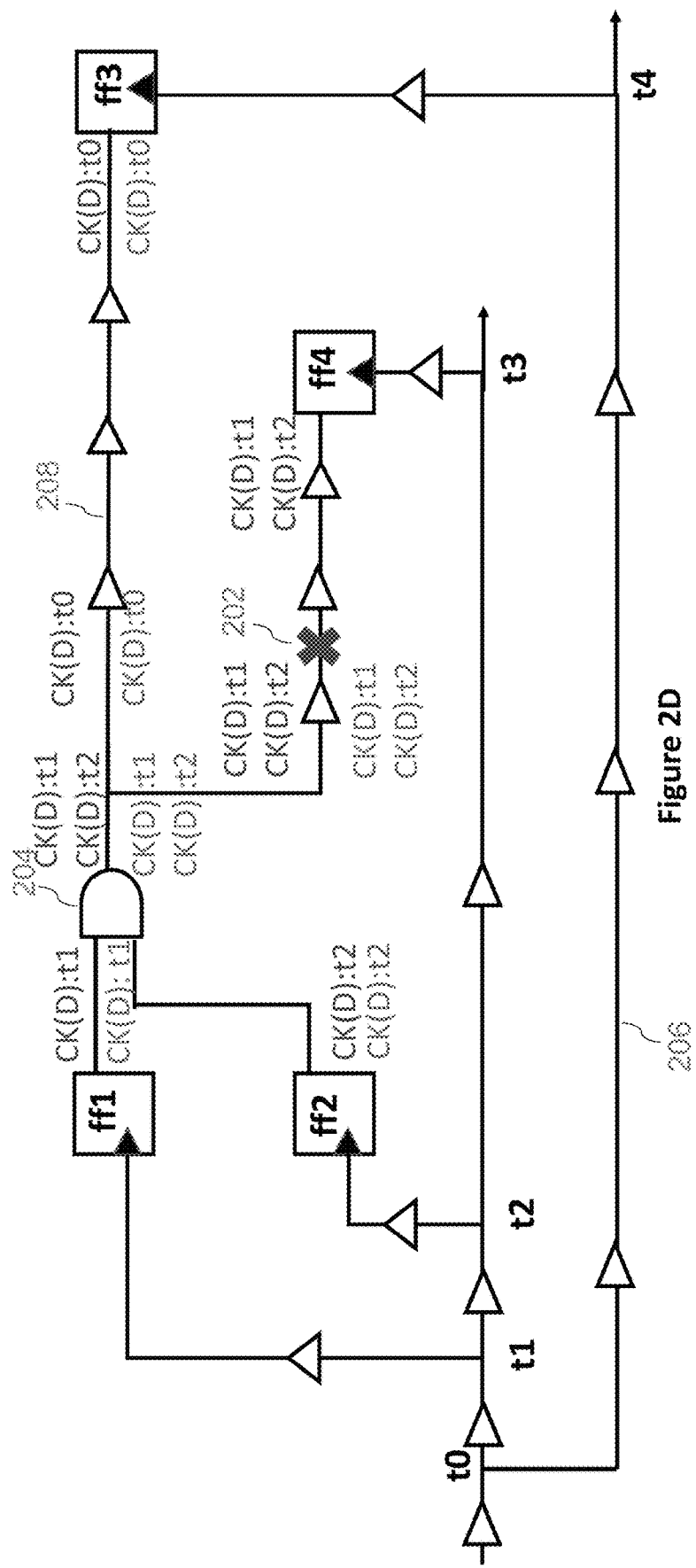

This aspect is illustrated in more detail in FIG. 2D.

More particularly, the upper phases in FIG. 2D represent the phases that are visible in View 1 of the MMMC analysis, whereas the lower phases represent the phases that are visible in View 2 of the MMMC analysis. In comparison to FIG. 2B, it can be seen that the phases seen in View 1 of the MMMC analysis are the same as the phases seen in View 1 of the SMSC analysis. However, in comparison to FIG. 2C, it can be seen that the phases seen in View 2 of the MMMC analysis are different than the phases seen in View 2 of the SMSC analysis. In particular, in View 2 of the MMMC analysis, the phases CK(D):t1 and CK(D):t2 from launch registers ff1 and ff2 do not merge at the AND gate 204, whereas in View 2 of the SMSC analysis, the phases CK(D):t0 from launch registers ff1 and ff2 do merge at the AND gate 204.

This difference in phases seen in MMMC and SMSC would causes timing analysis results for View 2 when running MMMC to be different from the timing analysis results for View 2 when running SMSC because no SOCV max operation takes place at the AND gate 204. This leads to different QoR for MMMC as compared to SMSC. Moreover, the increased number of phases seen in View 2 of the MMMC analysis causes increased runtime and memory requirements when running MMMC as compared to the combined requirements for individual SMSC runs. The increase can be exponential depending on the number of views where phase merging was stopped and the number of multi-fanin gates along a path where such merging was possible. A solution is therefore needed that will propagate the tag sets independently for each view so as to match SMSC timing QoR, as well as runtime and memory requirements.

Figure 3:
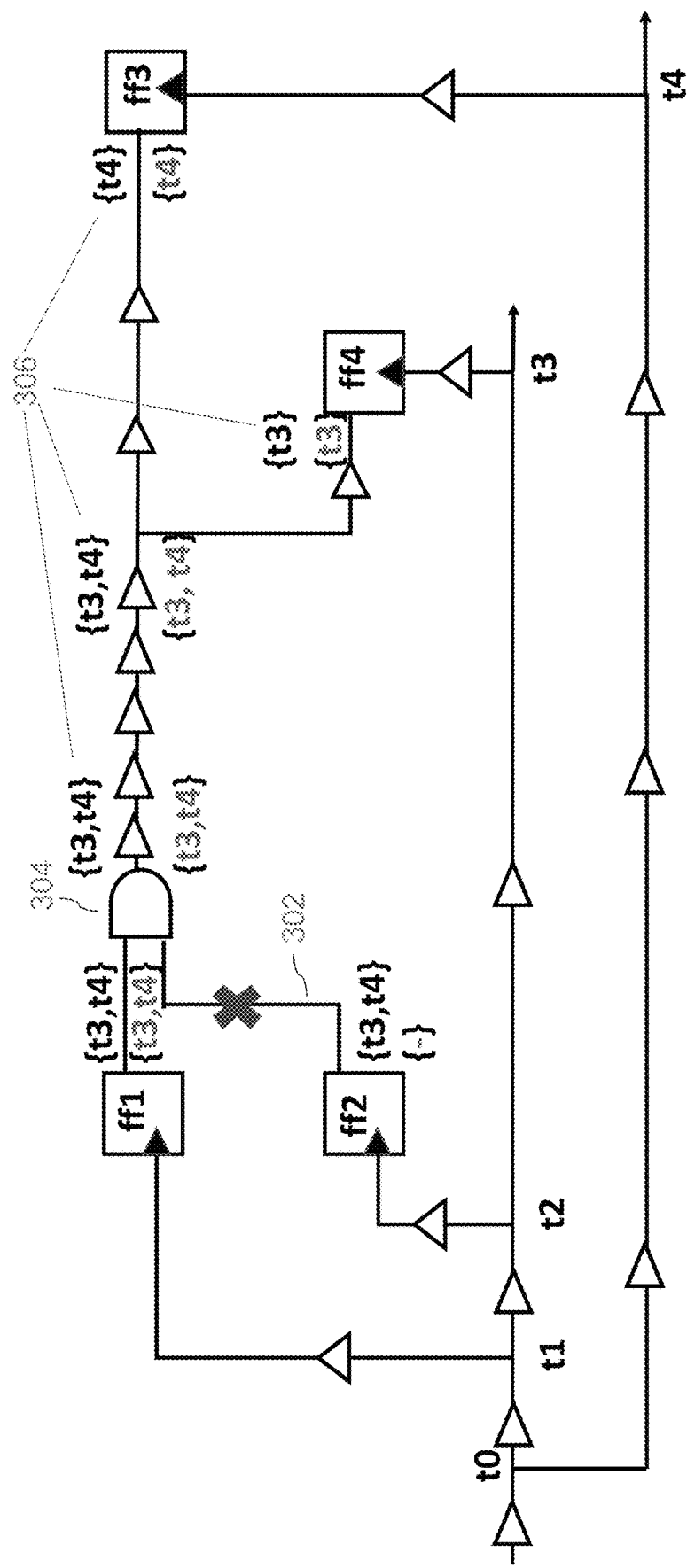
FIG. 3 is circuit diagram illustrating other example issues with conventional approaches.

FIG. 3 illustrates another problem in conventional approaches.

The example circuit to be analyzed shown in FIG. 3 includes launch registers ff1, ff2 and capture registers ff3 and ff4 having tags t4 and t3, respectively. In this example, there are two views for SMSC analysis, View 1 and View 2. As further illustrated by the X in this example, the path 302 between launch register ff2 and AND gate 304 is a disabled arc (e.g. a constraint) for View 2 but not View 1.

FIG. 3 further illustrates how the tag sets at the capture registers ff3, ff4 are back-propagated to the launch registers ff1, ff2. The tag sets in View 1 are indicated by the upper tag sets in FIG. 3, and tag sets in View 2 are indicated by the lower tag sets.

Depending upon netlist topology and set of disabled arcs, it is possible that for majority of data network, the tag sets are identical for Views 1 and 2. More particularly, as shown in FIG. 3, it can be seen that the tag sets for pins 306 are all identical for Views 1 and 2. A solution is needed that will not duplicate identical tag sets on data network pins.

Figure 4:
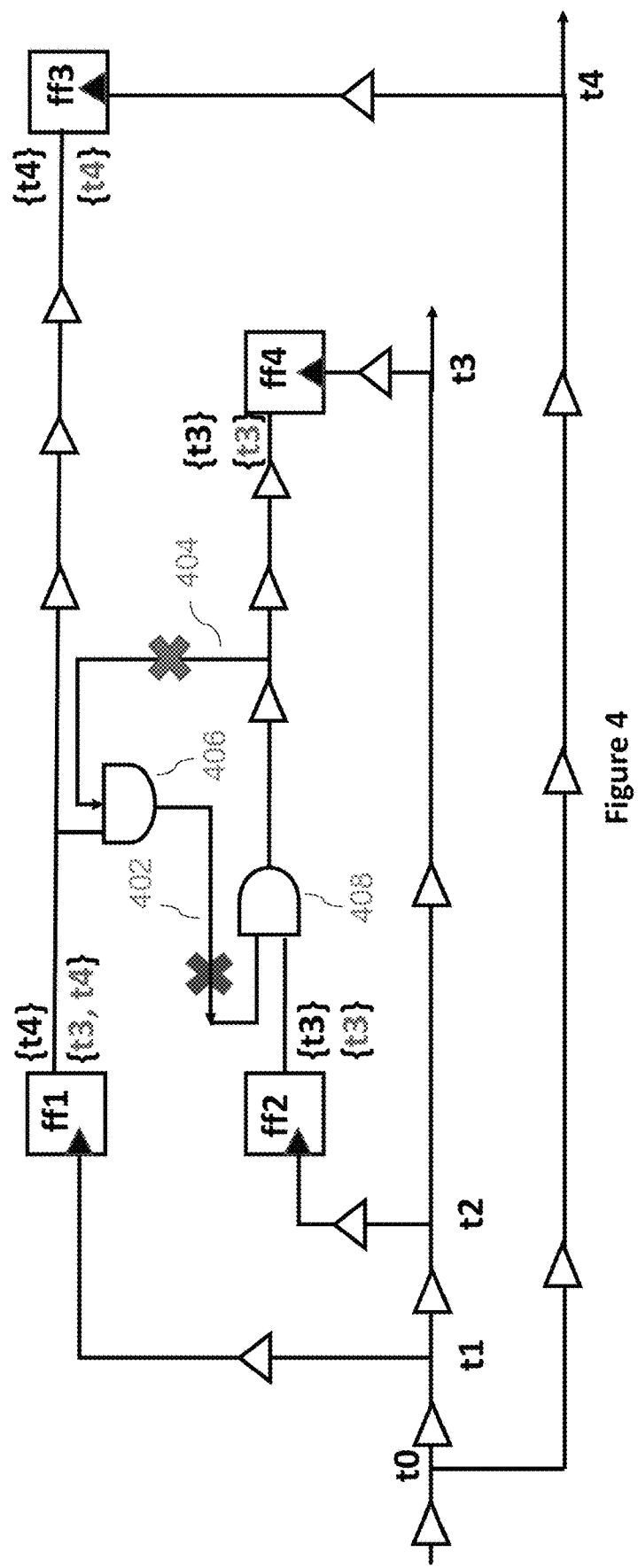
FIG. 4 is a circuit diagram illustrating further example issues with conventional approaches.

FIG. 4 further illustrates problems in conventional approaches.

The example circuit to be analyzed shown in FIG. 4 includes launch registers ff1, ff2 and capture registers ff3 and ff4 having capturing tags t4 and t3, respectively. The circuit further includes a loop that is formed by arcs 402 and 404 via AND gates 406 and 408. In this example, the analysis tool selected to break the loop in View 1 by disabling arc 402 but not arc 404, and to break the loop in View 2 by disabling arc 404, but not arc 402. This illustrates that loop breaking arcs can be different for different views. Similar to the problem discussed in connection with FIGS. 2A-2D, this difference between views can induce the same problems of timing mismatches, phases not merging and increase in runtime and memory requirements during MMMC analysis.

According to certain aspects, the present embodiments are directed to techniques for performing MMMC that address the above and other issues. According to further aspects, the present embodiments achieve quality of results (QoR) of each timing analysis view in the combined run in MMMC to match the QoR of each individual, separate run in SMSC.

Figure 5:
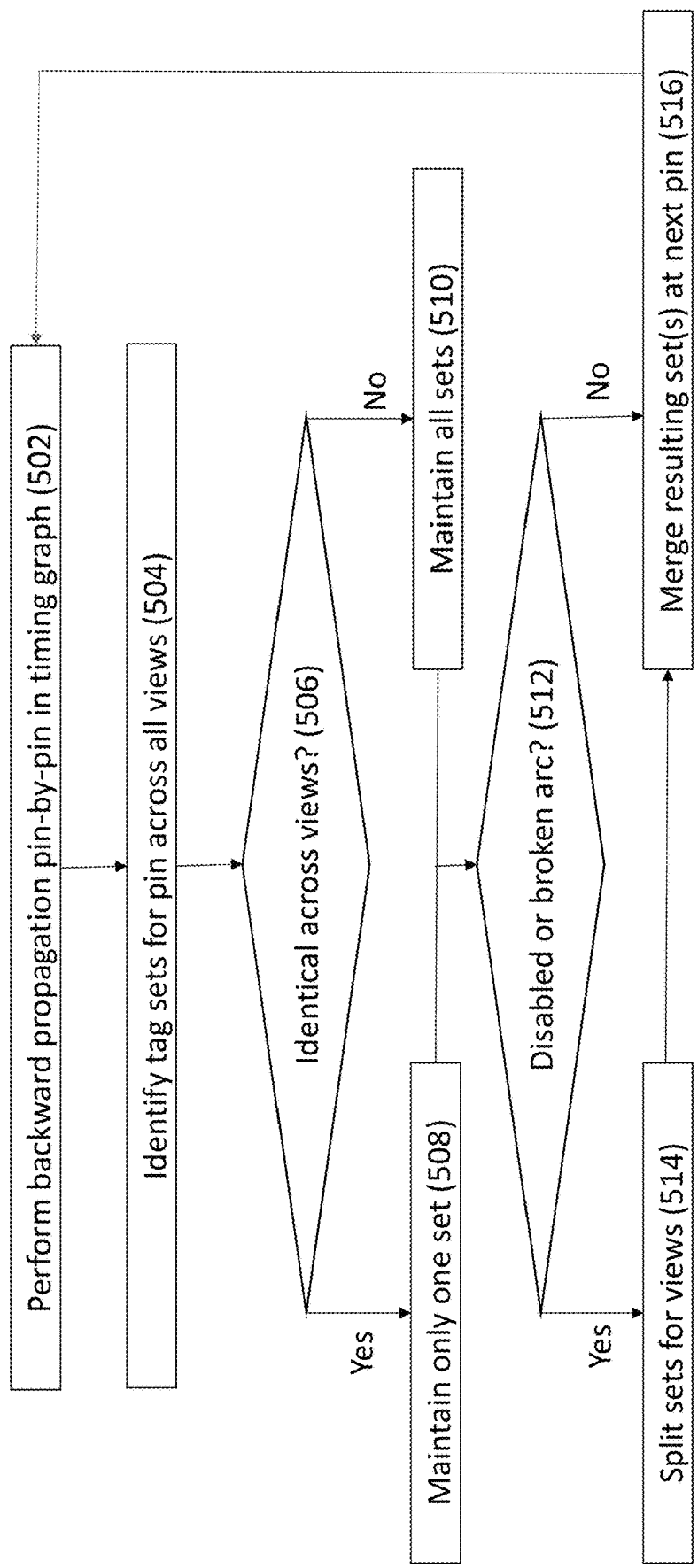
FIG. 5 is a flowchart illustrating an example methodology according to embodiments.

FIG. 5 is a flowchart illustrating an example methodology according to embodiments. Those skilled in the art will be able to understand how to implement such a methodology using or adapting a timing analysis system such as system 150 in FIG. 1 after being taught by the present examples.

As shown in FIG. 5, for a given circuit portion to be analyzed (e.g. launch/capture register pair), the method in 502 performs backward propagation pin-by-pin in the timing graph beginning from the capture point. At each pin, in 504, the tag sets are identified independently for each view. In 506, it is determined whether the tag sets for the pin are identical across all views. If so, in 508, only one tag set is maintained for propagation to the next pin, and the separate tag sets for each view are disregarded. Otherwise, the tag sets for all views are maintained in 510.

In 512, it is determined whether propagation to the next pin will encounter a disabled arc or a loop breaking arc. If so, in 514, if only one tag set was being maintained from the previous pin, the sets are split appropriately for each active view. In 516, the resulting set(s) are then back propagated to the next pin and merge with other sets, whether split for each active view, or one merged set that is active for all views. Processing then repeats for all timing pins back to all launch registers.

Figure 6A:
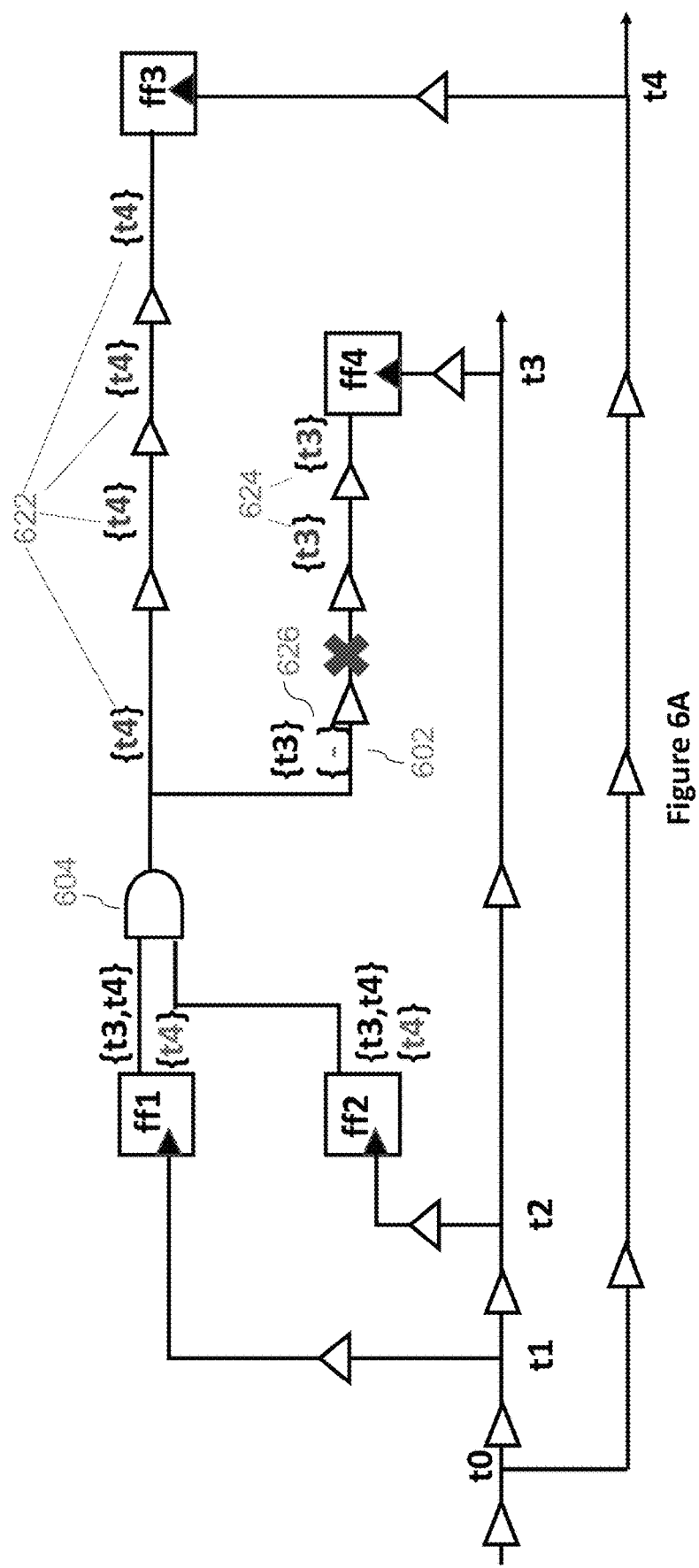
FIGS. 6A-6C are circuit diagrams that illustrate example aspects of the present embodiments.
Figure 6B:
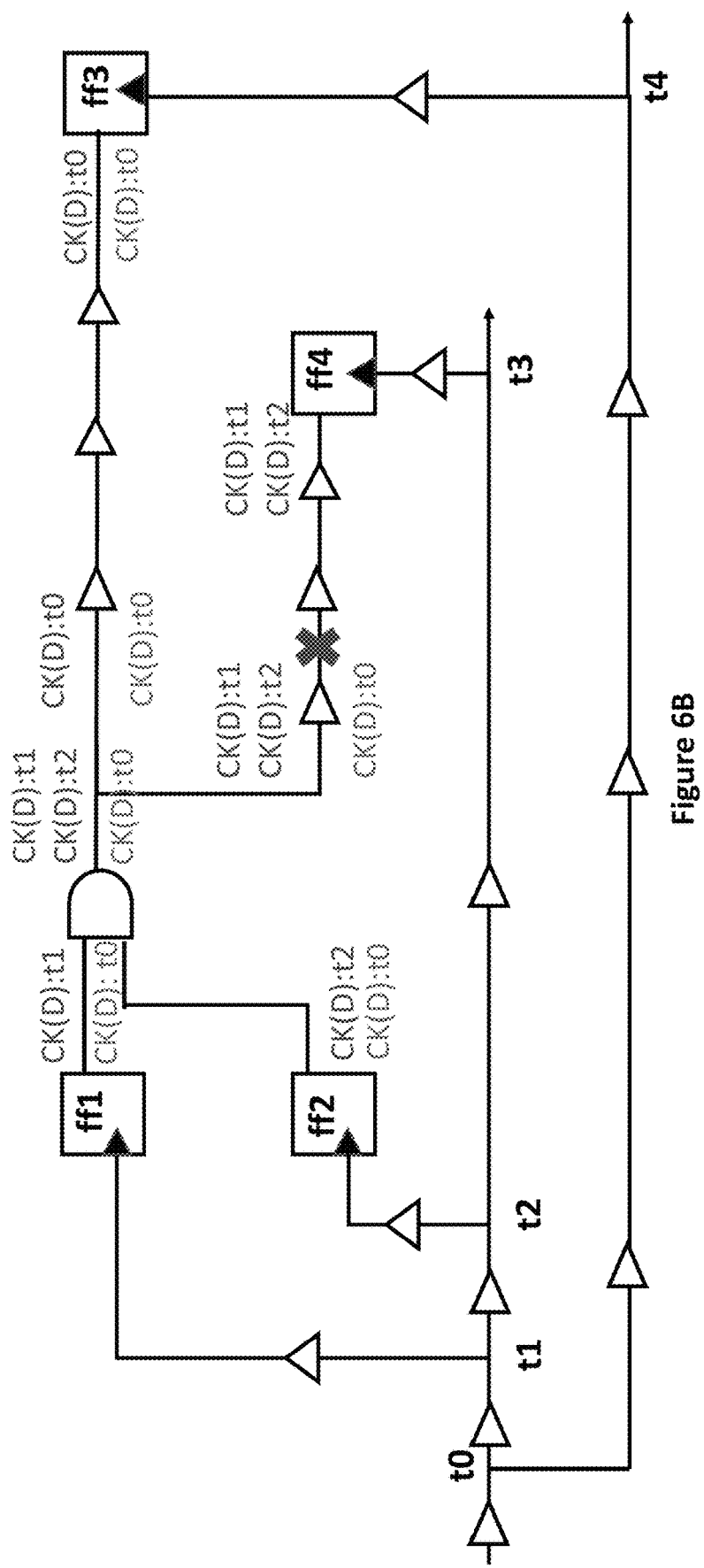
Figure 6C:
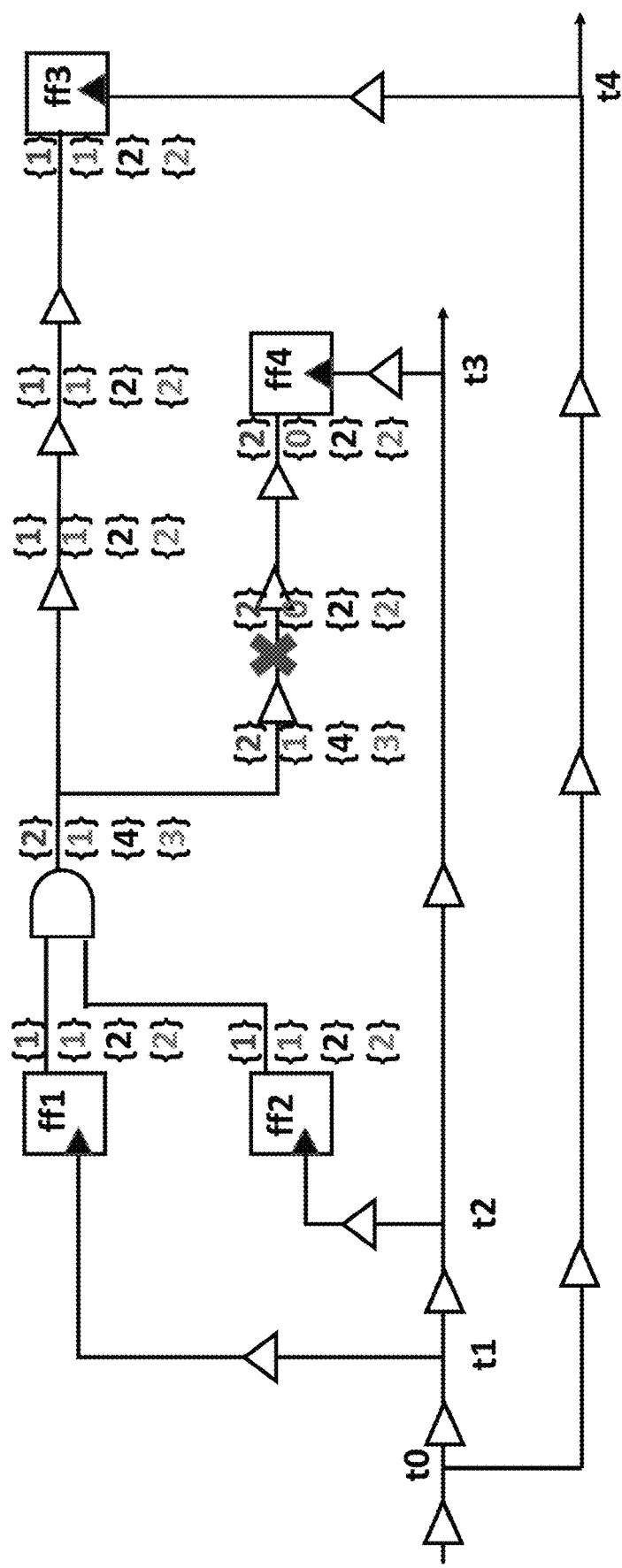

FIGS. 6A to 6C illustrate example aspects of the present embodiments.

The circuit in FIG. 6A is similar to the circuit in FIG. 2A, in which X represents disabled arc 602 for View 2 but not View 1. As in FIG. 2A, where there are two tag sets at a given location in the circuit, the top numbers represent the tag sets that are back-propagated in View 1, whereas the lower numbers represent the tag sets that are back-propagated in View 2. However, differently from the conventional approach depicted in FIG. 2A, and as can be further seen in FIG. 6A, where the tag sets are identical between views, only one tag set is back propagated. For example, tag sets {t4} that back-propagate from capture register ff3 are initially the same in both views, and so formed merged sets 622 at respective pin locations in the circuit.

Likewise, tag sets {t3} are also initially identical as they back-propagate from capture register ff4 and so formed merged sets 624 at respective pin locations in the circuit. However, when the location where the arc 602 is disabled, the merged set {t3} splits into {t3} and {-} for View 1 and View 2 respectively. These merge with set {t4} at the AND gate 604 and back propagate as sets {t3, t4} and {t4} for View 1 and 2 respectively.

Further aspects of the embodiments are illustrated in more detail in FIG. 6B, particularly with comparison to the conventional approach in FIGS. 2B-2D.

As in FIG. 2D, the upper phases in FIG. 6B represent the phases that are visible in View 1 of the MMMC analysis, whereas the lower phases represent the phases that are visible in View 2 of the MMMC analysis. In comparison to FIG. 2B, it can be seen that the phases seen in View 1 of the MMMC analysis are the same as the phases seen in View 1 of the SMSC analysis. Moreover, in comparison to FIG. 2C, it can be seen that the phases seen in View 2 of the MMMC analysis are the same as the phases seen in View 2 of the SMSC analysis. In particular, contrary to the conventional approach in FIG. 2D but similar to FIG. 2C, in View 2 of the MMMC analysis, the phases CK(D):t0 from launch registers ff1 and ff2 do merge at the AND gate 604.

As a result of this match between the MMMC analysis of the present embodiments and the SMSC analyses, there will be no timing mismatches between the results of the MMMC analysis and the separate results of the SMSC analyses.

Still further aspects of the embodiments are illustrated in more detail in FIG. 6C, particularly with comparison to the conventional approach in FIGS. 2B-2D.

FIG. 6C illustrates the number of phases that need to be maintained at each pin for SMSC View 1 (top number), SMSC View 2 (second from top number), conventional MMMC (third from top number) and MMMC according to the embodiments (bottom number). As can be seen, the number of clock phases that are maintained in MMMC according to the embodiments is the same as the combined number of clock phases in SMSC Views 1 and 2. By contrast, the number of clock phases that are maintained in conventional MMMC exceeds the combined number of clock phases in SMSC Views 1 and 2 at several different pin locations. This represents an increase in computational resource requirements that is eliminated by the techniques of the present embodiments.

Figure 7:
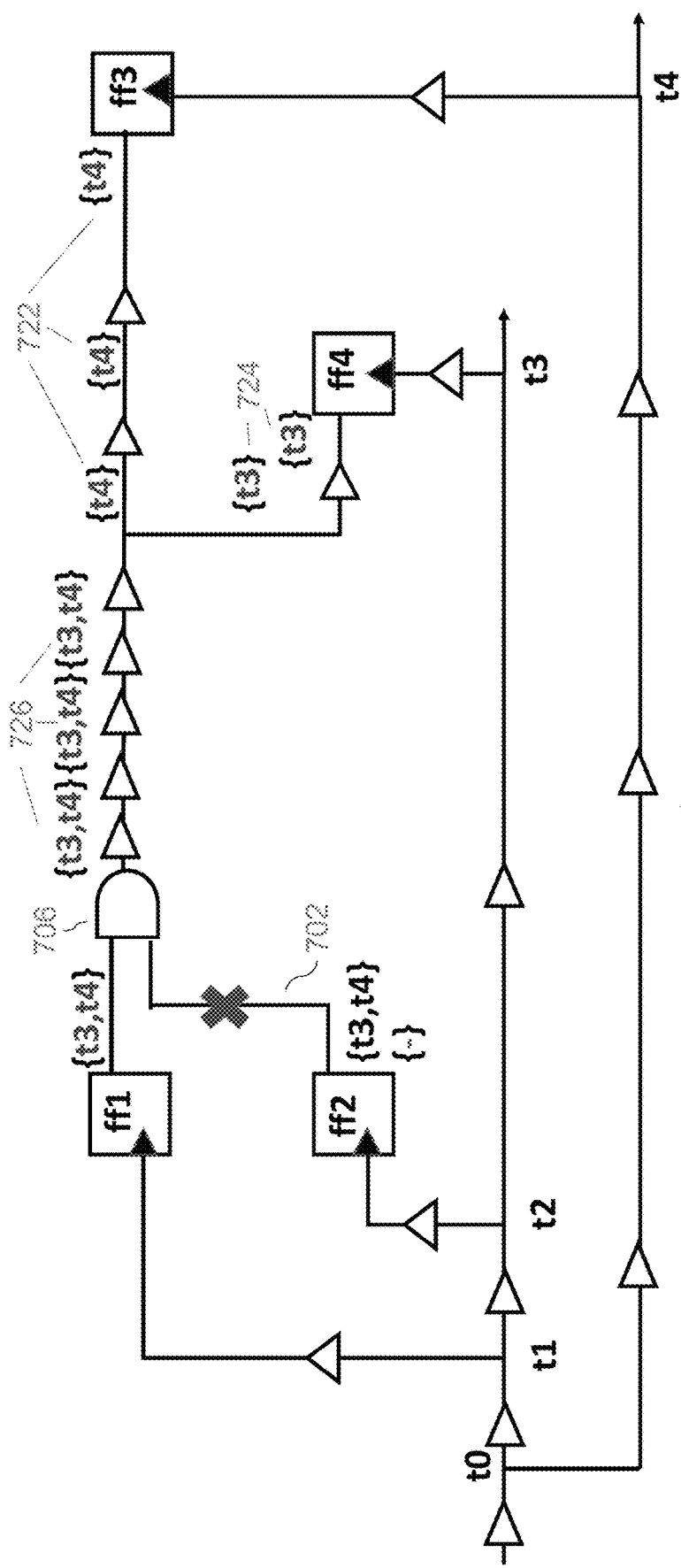
FIG. 7 is a circuit diagram that illustrates other example aspects of the present embodiments.

FIG. 7 further illustrates example aspects of the present embodiments

The circuit in FIG. 7 is similar to the circuit in FIG. 3, in which X represents disabled arc 702 for View 2 but not View 1. However, differently from the conventional approach depicted in FIG. 3, and as can be further seen in FIG. 7, where the tag sets are identical between views, only one tag set is back propagated. For example, tag sets {t4} that back-propagate from capture register ff3 are initially the same in both views, and so form a single set 722 at respective pin locations in the circuit. Likewise, tag sets {t3} are also initially identical as they back-propagate from capture register ff4 and so form a single set 724 at respective pin locations in the circuit. Still further, even after merging, only a single merged set 726 is maintained for respective pin locations. Only until AND gate 706, where disabled arc 702 is encountered, are separate tag sets required. This results in savings in both memory and runtime resources over the conventional approach.

Figure 8:
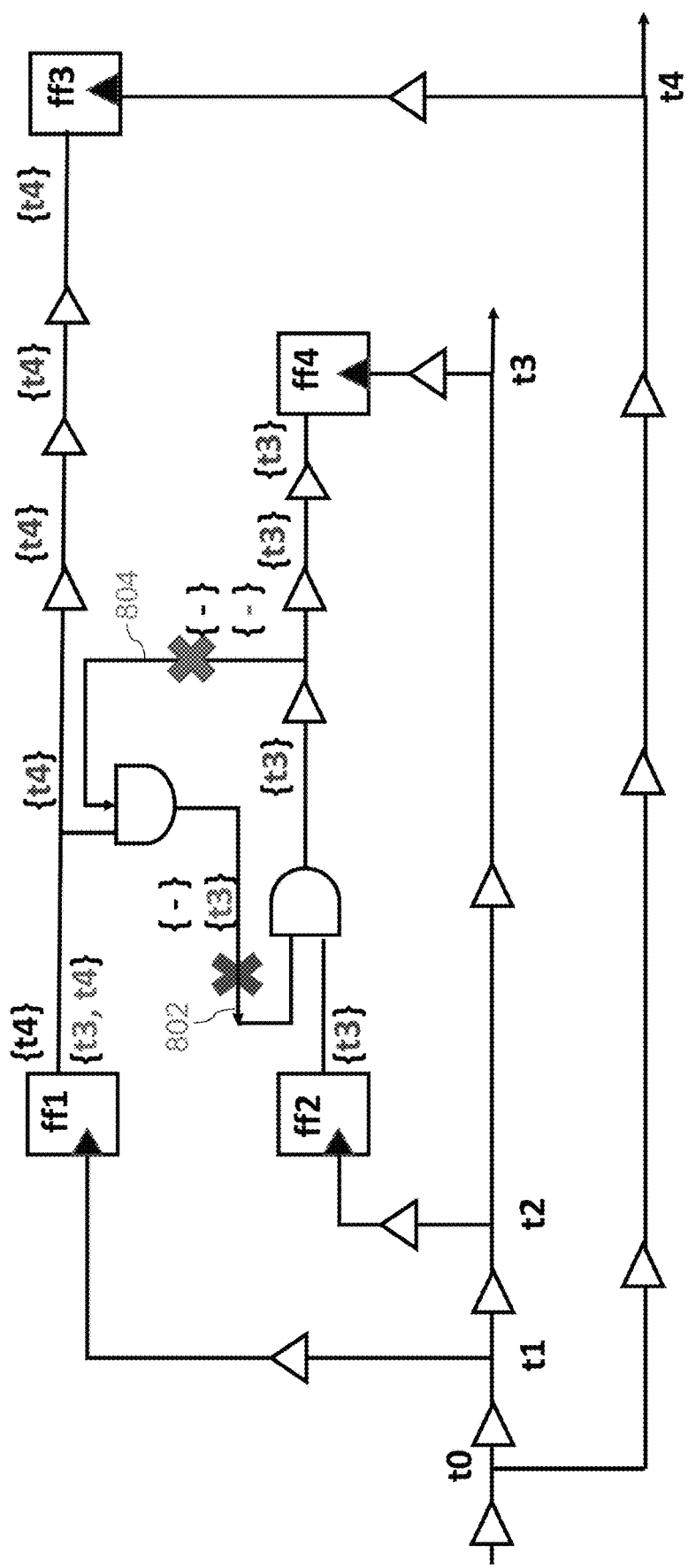
FIG. 8 is a circuit diagram that further illustrates example aspects of the present embodiments.

FIG. 8 further illustrates example aspects of the present embodiments.

The circuit in FIG. 8 is similar to the circuit in FIG. 4, in which loop breaking arcs 802 and 804 are present for one of View 1 and View 2, but not the other. However, differently from the conventional approach depicted in FIG. 4, and as can be further seen in FIG. 8, where the tag sets are identical between views, only one tag set is back propagated. So sets {t3} and {t4} representing merged sets for all views back propagate from capture registers ff4 and ff3, respectively. Across loop breaking arc 804, set {t3} splits into sets {-} and {t3} for Views 1 and 2 respectively. Across loop breaking arc 802, the split sets get modified to {-} and {-} for Views 1 and 2 respectively. These sets merge with combined set {t4} to create sets {t4} and {t3, t4} for Views 1 and 2 respectively. However, as in the previous example, the present embodiments result in savings in both memory and runtime resources over the conventional approach.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for performing multi-mode multi-corner (MMMC) timing analysis for a circuit portion in a circuit design, the MMMC timing analysis having a plurality of views, the circuit portion having a launch register and a capture register, the method comprising:
   preparing a timing graph for the circuit portion, the timing graph having tags corresponding to pins in the circuit portion;
   performing backward propagation pin-by-pin in the timing graph beginning from the capture register;

for each pin, independently identifying tag sets for each view of the MMMC timing analysis, the tag sets comprising one or more of the tags that are collected during the backward propagation;

determining whether the tag sets for the each pin are identical across all views;

when it has been determined that the tag sets for the each pin are identical across all views, maintaining only one tag set for all views for the pin; and performing the MMMC timing analysis for the circuit portion after the identifying and the determining of tag sets for all views.

2. The method of claim 1, further comprising:

determining whether backward propagation from the each pin to the next pin will encounter a disabled arc or a loop breaking arc; and if backward propagation to the next pin will encounter a disabled arc or a loop breaking arc, and if only one tag set was being maintained from the each pin, splitting the tag sets for each view.

3. The method of claim 2, further comprising:

backward propagating the tag sets from the pin to the next pin;

merging the tag sets with other sets, whether split for each active view, or one merged set that is active for all views.

4. The method of claim 1, further comprising:

performing MMMC timing analysis for the circuit portion using only the maintained identical tag set during forward propagation from the each pin.

5. The method of claim 4, wherein the performing MMMC timing analysis includes obtaining similar QoR as achieved by multiple SMSC timing analyses.

6. The method of claim 1, wherein the plurality of views represent a plurality of different delay corners for the circuit design.

7. The method of claim 1, wherein the plurality of views represent a plurality of different mode constraints for the circuit design.

8. The method of claim 1, wherein the plurality of views represent a plurality of different library sets for the circuit design.

9. A non-transitory computer readable medium having instructions stored thereon, which when executed by a computer, cause the computer to execute a method for performing multi-mode multi-corner (MMMC) timing analysis for a circuit portion in a circuit design, the MMMC timing analysis having a plurality of views, the circuit portion having a launch register and a capture register, the method comprising:

preparing a timing graph for the circuit portion, the timing graph having tags corresponding to pins in the circuit portion;

performing backward propagation pin-by-pin in the timing graph beginning from the capture register;

for each pin, independently identifying tag sets for each view of the MMMC timing analysis, the tag sets comprising one or more of the tags that are collected during the backward propagation;

determining whether the tag sets for the each pin are identical across all views;

when it has been determined that the tag sets for the each pin are identical across all views, maintaining only one tag set for all views for the pin; and performing the MMMC timing analysis for the circuit portion after the identifying and the determining of tag sets for all views.

10. The non-transitory computer readable medium of claim 9, the method further comprising:

determining whether backward propagation from the each pin to the next pin will encounter a disabled arc or a loop breaking arc; and if backward propagation to the next pin will encounter a disabled arc or a loop breaking arc, and if only one tag set was being maintained from the each pin, splitting the tag sets for each view.

11. The non-transitory computer readable medium of claim 10, the method further comprising:

backward propagating the tag sets from the pin to the next pin;

merging the tag sets with other sets, whether split for each active view, or one merged set that is active for all views.

12. The non-transitory computer readable medium of claim 9, the method further comprising:

performing MMMC timing analysis for the circuit portion using only the maintained identical tag set during forward propagation from the each pin.

13. The non-transitory computer readable medium of claim 12, wherein the performing MMMC timing analysis includes obtaining similar QoR as achieved by multiple SMSC timing analyses.

14. The non-transitory computer readable medium of claim 9, wherein the plurality of views represent a plurality of different delay corners for the circuit design.

15. The non-transitory computer readable medium of claim 9, wherein the plurality of views represent a plurality of different mode constraints for the circuit design.

16. The non-transitory computer readable medium of claim 9, wherein the plurality of views represent a plurality of different library sets for the circuit design.

17. A system for performing for multi-mode multi-corner (MMMC) timing analysis for a circuit portion in a circuit design, the MMMC timing analysis having a plurality of views, the circuit portion having a launch register and a capture register, the system comprising:

a storage for storing a timing graph for the circuit design;

a static timing analysis (STA) module being configured to:

prepare the timing graph for the circuit portion in the storage, the timing graph having tags corresponding to pins in the circuit portion;

perform backward propagation pin-by-pin in the timing graph beginning from the capture register;

for each pin, independently identify tag sets for each view of the MMMC timing analysis, the tag sets comprising one or more of the tags that are collected during the backward propagation;

determine whether the tag sets for the each pin are identical across all views;

when it has been determined that the tag sets for the each pin are identical across all views, maintain only one tag set for all views for the pin; and perform the MMMC timing analysis for the circuit portion after the identifying and the determining of tag sets for all views.

18. The system of claim 17, wherein the STA module is further configured to:

determine whether backward propagation from the each pin to the next pin will encounter a disabled arc or a loop breaking arc; and if backward propagation to the next pin will encounter a disabled arc or a loop breaking arc, and if only one tag set was being maintained from the each pin, split the tag sets for each view.

19. The system of claim 18, wherein the STA module is further configured to:
    backward propagate the tag sets from the pin to the next pin;
    merge the tag sets with other sets, whether split for each active view, or one merged set that is active for all views.

20. The system of claim 17, wherein the STA module is further configured to:
    perform MMMC timing analysis for the circuit portion using only the maintained identical tag set during forward propagation from the each pin.

* * * * *